US012728930B2

(12) United States Patent
Zhang et al.

(10) Patent No.: US 12,728,930 B2
(45) Date of Patent: Sep. 8, 2026

(54) LOWER VEHICLE BODY REAR STRUCTURE AND VEHICLE

(71) Applicant: GREAT WALL MOTOR COMPANY LIMITED, Baoding (CN)

(72) Inventors: Shuren Zhang, Baoding (CN); Zhijie He, Baoding (CN); Tao Zhang, Baoding (CN); Yuntao Li, Baoding (CN); Qiang Chen, Baoding (CN); Xinyu Liang, Baoding (CN); Ren Li, Baoding (CN); Wenbo Wu, Baoding (CN)

(73) Assignee: GREAT WALL MOTOR COMPANY LIMITED, Baoding (CN)

(*) Notice: Subject to any disclaimer, the term of this patent is extended or adjusted under 35 U.S.C. 154(b) by 308 days.

(21) Appl. No.: 18/682,146

(22) PCT Filed: Jun. 27, 2022

(86) PCT No.: PCT/CN2022/101484

§ 371 (c)(1),
(2) Date: Feb. 8, 2024

(87) PCT Pub. No.: WO2023/016106

PCT Pub. Date: Feb. 16, 2023

(65) Prior Publication Data

US 2025/0121890 A1 Apr. 17, 2025

(30) Foreign Application Priority Data

Aug. 13, 2021 (CN) ......................... 202110931743.0

(51) Int. Cl.
*B62D 25/20* (2006.01)
*B62D 21/15* (2006.01)
(Continued)

(52) U.S. Cl.
CPC ....... *B62D 25/2027* (2013.01); *B62D 21/152* (2013.01); *B62D 25/088* (2013.01);
(Continued)

(58) Field of Classification Search
CPC .... B62D 21/152; B62D 25/088; B62D 25/16; B62D 25/2027; B62D 29/008; B62D 43/06
See application file for complete search history.

(56) References Cited

U.S. PATENT DOCUMENTS

| | | | | |
|---|---|---|---|---|
| 2010/0072786 | A1* | 3/2010 | Koyama | B62D 25/2027 296/203.04 |
| 2021/0061081 | A1* | 3/2021 | Kodama | B60K 1/04 |
| 2022/0379974 | A1* | 12/2022 | Nitta | B62D 25/2036 |

FOREIGN PATENT DOCUMENTS

| | | | |
|---|---|---|---|
| CN | 104670335 A | | 6/2015 |
| CN | 207060175 U | * | 3/2018 |

(Continued)

*Primary Examiner* — Edwin A Young
(74) *Attorney, Agent, or Firm* — Bayramoglu Law Offices LLC

(57) ABSTRACT

A lower vehicle body rear structure includes a rear floor integrally formed in a die-casting mode, rear floor longitudinal beam rear sections fixedly connected to the rear floor, a shelf, and a spare tire cabin. Rear floor longitudinal beams arranged on the two sides of the rear floor, and a rear floor middle cross beam and a rear floor rear cross beam which are connected between the rear floor longitudinal beams are formed on the rear floor, and rear wheel covers connected to the rear floor longitudinal beams are respectively arranged on the two sides of the rear floor. The shelf is located above the rear floor, and the two ends of the shelf are connected to the rear wheel covers by means of connecting plates; and the rear floor, the shelf and the two connecting plates are connected to form an annular structure.

14 Claims, 5 Drawing Sheets

(51) Int. Cl.

| | |
|---|---|
| ***B62D 25/08*** | (2006.01) |
| ***B62D 25/16*** | (2006.01) |
| ***B62D 29/00*** | (2006.01) |
| ***B62D 43/06*** | (2006.01) |

(52) U.S. Cl.
CPC ........... *B62D 25/16* (2013.01); *B62D 29/008* (2013.01); *B62D 43/06* (2013.01)

(56) References Cited

FOREIGN PATENT DOCUMENTS

| | | | |
|---|---|---|---|
| CN | 208036448 | U | 11/2018 |
| CN | 209008696 | U | 6/2019 |
| CN | 209667244 | U | 11/2019 |
| CN | 111098933 | A | 5/2020 |
| CN | 111806575 | A | 10/2020 |
| JP | H06211167 | A | 8/1994 |

* cited by examiner

LOWER VEHICLE BODY REAR STRUCTURE AND VEHICLE

CROSS REFERENCE TO THE RELATED APPLICATIONS

This application is the national phase entry of International Application No. PCT/CN2022/101484, filed on Jun. 27, 2022, which is based upon and claims priority to Chinese Patent Application No. 202110931743.0, filed on Aug. 13, 2021, the entire contents of which are incorporated herein by reference.

TECHNICAL FIELD

The present disclosure relates to the technical field of vehicle bodies and more particularly, to a lower vehicle body rear structure. Meanwhile, the present disclosure also relates to a vehicle provided with the lower vehicle body rear structure described above.

BACKGROUND

The structural design of a rear floor of a vehicle plays an important role in force transmission and safety collision performance of a vehicle body, and a high-performance force transmission structure of the rear floor of the vehicle may significantly improve ride comfort and increase a driving safety factor.

At present, a conventional rear floor of the vehicle is mainly composed of a plurality of metal plates such as a rear floor panel, a rear floor middle cross beam, a front floor rear cross beam, and a rear floor longitudinal beam, and the structural design thereof has the following disadvantages in practical applications:

1. the front and rear force transmission is performed at the portion of the rear floor of the vehicle by mainly relying on a rear floor longitudinal beam assembly and a front floor doorsill beam, so that a force transmission path is single; and when the vehicle encounters a rear collision, the rear floor longitudinal beam assembly and the front floor doorsill beam suffer more stress, thereby being likely to lead to a serious bending phenomenon in a lap-joint area of the rear floor longitudinal beam and the front floor doorsill, and then causing a serious safety threat to passengers and a driver; and
2. in a manufacturing process of the conventional rear floor of the vehicle, a plurality of sheet metal parts are usually welded into one assembly part by a spot welding process, so that there is a problem of local structural connection defect as the overall rigidity of the rear floor is affected by the connection performance of welding points, thereby resulting in insufficient structural strength of the overall structure, so that the risk of bending of the rear floor structure is relatively high in the event of collision.

In addition, when a rear collision of the vehicle occurs, there are also problems of single impact force path and relatively poor buffering effect. Meanwhile, a shelf and a spare tire cabin which are located at the rear of vehicle body generally have relatively poor strength themselves, and are mounted on the sheet metal parts on two sides of the vehicle body only by simple clamping or screws, so that a bearing capacity is relatively low, and the condition of damage or falling off is likely to occur when heavy objects are placed on the shelf and the spare tire cabin.

SUMMARY

In view of the foregoing, the present disclosure aims at providing a lower vehicle body rear structure to improve an overall arrangement structure of a vehicle body framework of a rear portion of a vehicle, a shelf, and a spare tire cabin.

In order to achieve the above object, the technical solution of the present disclosure is achieved as follows.

A lower vehicle body rear structure includes a rear floor integrally formed in a die-casting mode, rear floor longitudinal beam rear sections fixedly connected to the rear floor, a shelf, and a spare tire cabin;

- wherein rear floor longitudinal beams arranged on two sides of the rear floor respectively, and a rear floor middle cross beam and a rear floor rear cross beam which are connected between the rear floor longitudinal beams on the two sides are formed on the rear floor, and rear wheel covers connected to the rear floor longitudinal beams on the corresponding sides are arranged on the two sides of the rear floor respectively;
- the shelf is located above the rear floor, and two ends of the shelf are arranged in one-to-one correspondence with the rear wheel covers on the two sides and both connected to the rear wheel covers by means of connecting plates, and the rear floor, the shelf and the two connecting plates are connected to form an annular structure arranged along a height direction of a vehicle body; and
- a number of the rear floor longitudinal beam rear sections is two, and the rear floor longitudinal beam rear sections are connected to rear ends of the rear floor longitudinal beams on the two sides, a rear supporting plate is connected between rear ends of the two rear floor longitudinal beam rear sections, and the spare tire cabin is arranged in a mounting space defined by the rear floor, the rear supporting plate, and the rear floor longitudinal beam rear sections on the two sides.

Further, rear floor force transmission beams are formed on inner sides of the rear floor longitudinal beams on the two sides; a rear end of each of the rear floor force transmission beams is connected to the rear floor middle cross beam; and the rear floor longitudinal beam and the rear floor force transmission beam on each side are connected by means of the rear floor middle cross beam to form a herringbone-shaped force transmission passage.

Further, a rear floor connecting beam is formed at a front end of the rear floor; the rear floor connecting beam is connected between the rear floor longitudinal beams on the two sides; and a front end of each of the rear floor force transmission beams is connected to the rear floor connecting beam.

Further, a reinforcing rib is formed on at least one of the rear floor longitudinal beams, the rear floor middle cross beam, the rear wheel covers, the rear floor force transmission beams, the rear floor connecting beam, and the rear floor rear cross beam.

Further, a rear spring mounting seat is formed on the rear floor longitudinal beams on the two sides respectively.

Further, a rear shock absorber mounting seat is formed on the rear wheel covers on the two sides respectively.

Further, the rear floor longitudinal beam rear section is integrally formed in an extruding mode; a cross section of the rear floor longitudinal beam rear section is in a shape of a rectangle with a bar across two opposite edges of the rectangle; and an overhanging lap-joint plate is formed at a side portion of the rear floor longitudinal beam rear section.

Further, an inserted groove is formed in a rear end of the rear floor longitudinal beam; and each of the rear floor longitudinal beam rear sections is inserted with the corresponding rear floor longitudinal beam to be fixedly connected together.

Further, the shelf includes an upper plate, and a lower plate buckled and fixedly connected to a bottom of the upper plate; the upper plate has a plurality of bending portions to be similar to a shape of steps; and a cavity is defined by the lower plate and the upper plate.

Further, a connecting seat is formed at a top of the rear wheel cover; one end of the connecting plate connected to the rear wheel cover is connected to the connecting seat; and one end of the connecting plate connected to the shelf is connected to a bottom of the lower plate.

Further, the spare tire cabin includes a spare tire cabin body formed with an accommodating chamber having a top opening; a curled edge which is curled outwards is formed at a top of the spare tire cabin body, and the curled edge is provided with a fixing portion for fixing the spare tire cabin body in the mounting space; and a reinforcing structure protruding downwards is formed on a bottom end surface of the spare tire cabin body, and the reinforcing structure is in a honeycomb shape.

Further, reinforcing ribs protruding outwards are formed on an outer side wall of the spare tire cabin body; and a number of the reinforcing ribs is more than one, and the reinforcing ribs are distributed at intervals along a circumferential direction of the spare tire cabin body.

Further, an annular rib protruding downwards is formed on the bottom end surface of the spare tire cabin body; the reinforcing structure is located inside the annular rib and connected to an inner wall of the annular rib; and a bottom end of the reinforcing rib extends to the bottom end surface of the spare tire cabin body and connected to an outer wall of the annular rib.

Further, the rear floor is integrally formed in the die-casting mode by adopting cast aluminum; the shelf is integrally formed in an extruding mode by adopting aluminum alloy; and the spare tire cabin is integrally formed in an injection molding mode.

Compared with the prior art, the present disclosure has the following advantages.

According to the lower vehicle body rear structure of the present disclosure, the shelf and the rear floor integrally formed are connected into a whole by means of the connecting plates, and the annular reinforcing structure is formed in the height direction of the vehicle body, so that the bearing performance of the shelf located at the rear portion of the vehicle may be improved; the spare tire cabin is mounted in the space defined by the rear floor, the rear floor longitudinal beam rear sections, and the rear supporting plate, so that the spare tire cabin has a stable bearing foundation; meanwhile, by integrally forming a plurality of beam body structures in the vehicle body framework on the rear floor, the structural compactness and assembly efficiency of the vehicle body framework are improved, so that the overall arrangement structure of the vehicle body framework of the rear portion of the vehicle, the shelf, and the spare tire cabin is improved.

In addition, the curled edge is arranged at the top of the spare tire cabin body, so that the lap-joint plate may be conveniently lapped on a frame defined by the rear floor, the rear floor longitudinal beam rear sections, and the rear supporting plate; and by arranging the fixing portion on the curled edge, the fastening and mounting of the spare tire cabin may be completed in a manner of matching a mounting hole with a screw. The reinforcing structure, and the matched reinforcing structure of the reinforcing rib and the annular rib on the spare tire cabin body may greatly improve the overall strength of the spare tire cabin, thereby being beneficial to the improvement of the bearing performance of the spare tire cabin. The spare tire cabin is manufactured by adopting an injection molding process, and thus has the advantages of mature process and convenience in machining and molding.

Another object of the present disclosure is to provide a vehicle, wherein a vehicle body of the vehicle is provided with the lower vehicle body rear structure as described above.

The beneficial effects of the vehicle of the present disclosure with respect to the prior art are the same as those of the lower vehicle body rear structure described above, and will not be described in detail herein.

BRIEF DESCRIPTION OF THE DRAWINGS

The accompanying drawings which constitute a part of this disclosure are included to provide a further understanding of the present disclosure, and illustrative examples of the present disclosure and the description thereof serve to explain the present disclosure and do not constitute an undue limitation of the present disclosure. In the drawings.

DESCRIPTION OF REFERENCE NUMERALS

Figure 1:
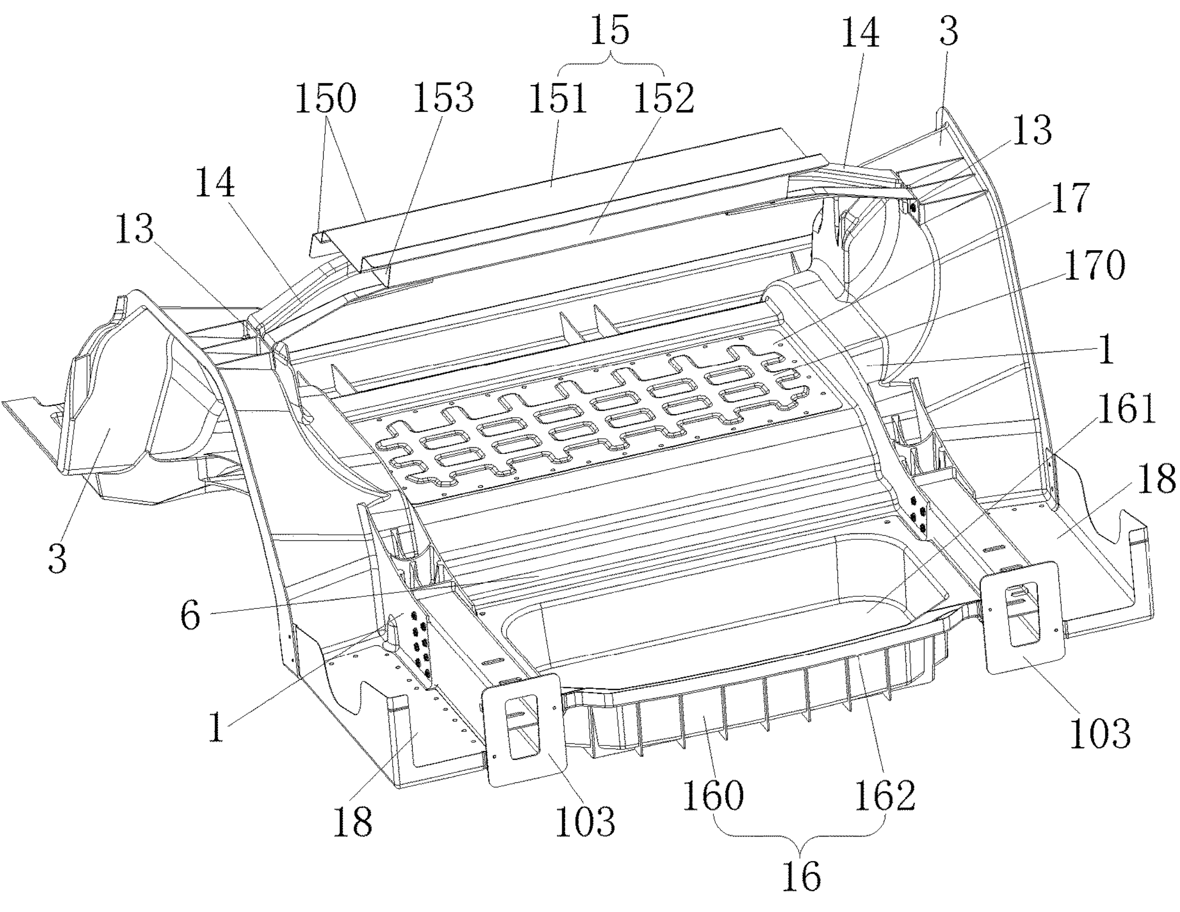
FIG. 1 is a schematic diagram showing a stereoscopic structure of a lower vehicle body rear structure according to an example of the present disclosure.

- 1. rear floor longitudinal beam; 101. rear spring mounting seat; 102. rear suspension mounting point; 103. rear floor longitudinal beam rear section;
- 2. rear floor middle cross beam; 3. rear wheel cover; 301. rear shock absorber mounting seat;
- 4. rear floor force transmission beam; 5. rear floor connecting beam; 6. rear floor rear cross beam; 7. reinforcing rib; 8. doorsill beam; 9. front floor reinforcing longitudinal beam; 10. lap-joint plate; 11. rear supporting plate; 12. inserted groove; 13. connecting seat; 14. connecting plate;

15. shelf; 150. bending portion; 151. upper plate; 152. lower plate; 153. cavity;

16. spare tire cabin; 160. spare tire cabin body; 161. accommodating chamber; 162. curled edge; 163. fixing portion; 164. reinforcing structure; 165. reinforcing rib; 166. annular rib;

17. rear floor cover plate; 170. reinforcing structure; and 18. storage box.

DETAILED DESCRIPTION OF THE EMBODIMENTS

It should be noted that examples in the present disclosure and features in the examples may be combined with each other without conflict.

In describing the present disclosure, it should be noted that the terms "upper", "lower", "inner", "outer", and the like, if any, indicating orientations or positional relationships based on the orientations or positional relationships shown in the accompanying drawings, are merely for convenience in describing the present disclosure and simplifying the description, and do not indicate or imply that the referenced devices or elements must have a particular orientation, be constructed and operated in a particular orientation, and therefore should not be construed as limiting the present disclosure. In addition, the terms "first", "second", and the like, if present, are used for descriptive purposes only and are not to be construed as indicating or implying relative importance.

Furthermore, in describing the present disclosure, the terms "mounting", "connecting", "connected", and "connector" are to be construed broadly, unless expressly limited otherwise. For example, it may be a fixed connection, a detachable connection, or an integral connection; it may be a mechanical connection or an electrical connection; and it may be direct connection or indirect connection through an intermediate medium, and may be internal communication between two elements. The specific meaning of the above terms in this disclosure may be understood by those of ordinary skill in the art in conjunction with a specific context.

The present disclosure will now be described in detail in connection with examples with reference to the accompanying drawings.

This example relates to a lower vehicle body rear structure which may improve an overall arrangement structure of a vehicle body framework of a rear portion of a vehicle, a shelf 15, and a spare tire cabin 16.

In general, the lower vehicle body rear structure includes a rear floor integrally formed in a die-casting mode, rear floor longitudinal beam rear sections 103 fixedly connected to the rear floor, a shelf 15, and a spare tire cabin 16;

wherein rear floor longitudinal beams 1 arranged on two sides respectively, and a rear floor middle cross beam 2 and a rear floor rear cross beam 6 which are connected between the rear floor longitudinal beams 1 on the two sides are formed on the rear floor, and rear wheel covers 3 connected to the rear floor longitudinal beams 1 on the corresponding sides are arranged on the two sides of the rear floor respectively.

The shelf 15 is located above the rear floor, and two ends of the shelf 15 are arranged in one-to-one correspondence with the rear wheel covers 3 on the two sides and both connected to the rear wheel covers 3 by means of connecting plates 14; and at the moment, the rear floor, the shelf 15 and the two connecting plates 14 are connected to form an annular structure arranged along a height direction of a vehicle body.

Two rear floor longitudinal beam rear sections 103 are provided to be connected to rear ends of the rear floor longitudinal beams 1 on the two sides, a rear supporting plate 11 is connected between rear ends of the two rear floor longitudinal beam rear sections 103, and the spare tire cabin 16 is arranged in a mounting space defined by the rear floor, the rear supporting plate 11, and the rear floor longitudinal beam rear sections 103 on the two sides.

Figure 2:
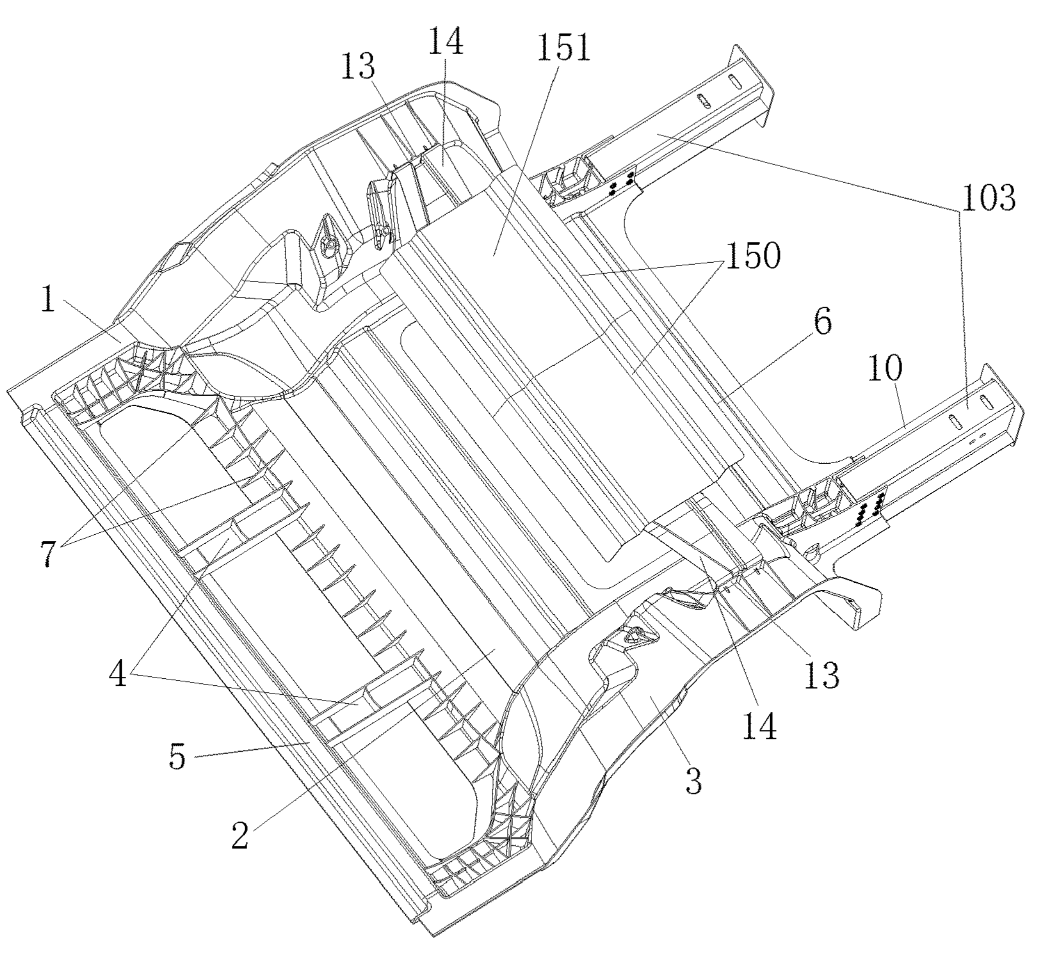
FIG. 2 is a schematic structural diagram of the lower vehicle body rear structure according to an example of the present disclosure after a shelf and a spare tire cabin are removed.

Based on the above design concept, an exemplary structure of the lower vehicle body rear structure of this example is shown in FIG. 1 and FIG. 2. As described above, the lower vehicle body rear structure mainly includes the rear floor integrally formed in the die-casting mode, the rear floor longitudinal beam rear sections 103 fixedly connected to the rear floor, the shelf 15, and the spare tire cabin 16.

The rear floor longitudinal beams 1 arranged on the two sides respectively, and the rear floor middle cross beam 2 connected between the rear floor longitudinal beams 1 on the two sides are formed on the rear floor, wherein rear floor force transmission beams 4 are formed on inner sides of the rear floor longitudinal beams 1 on the two sides, and a rear end of each of the rear floor force transmission beams 4 is connected to the rear floor middle cross beam 2. In addition, the rear wheel covers 3 connected to the rear floor longitudinal beams 1 on the corresponding sides are arranged on the two sides of the rear floor longitudinal beams 1 respectively.

On this basis, the shelf 15 is located above the rear floor, and two ends of the shelf 15 are arranged in one-to-one correspondence with the rear wheel covers 3 on the two sides and both connected to the rear wheel covers 3 by means of connecting plates 14. At the moment, the rear floor, the shelf 15 and the two connecting plates 14 are connected to form an annular structure arranged along the height direction of the vehicle body.

The shelf 15 and the rear floor integrally formed are connected into a whole by means of the connecting plates 14, the annular reinforcing structure is formed in the height direction of the vehicle body, and the shelf 15 is located at an upper portion of the annular structure, so that the shelf 15 is more closely connected to a base framework of the vehicle body, thereby being conducive to the improvement of the bearing performance of the shelf 15 located at the rear portion of the vehicle.

Preferably, the above shelf 15 is integrally formed in an extruding mode by adopting aluminum alloy, a platy structure may be adopted for the shelf 15, and a preferred structural form may be provided as follows. The shelf 15 includes an upper plate 151 having a plurality of bending portions 150 to be similar to a shape of steps, and a lower plate 152 buckled and fixedly connected to a bottom of the upper plate 151. A cavity 153 is defined by the lower plate 152 and the upper plate 151 which are buckled together.

An integrally extruded structure is adopted for manufacturing the shelf 15, so that the shelf 15 is convenient to machine and make, and has the advantage of weight reduction. The bending portion 150 is arranged to form the cavity 153, thereby being conducive to the enhancement of the overall stereoscopic strength of the shelf 15.

In order to facilitate the mounting of the shelf 15, a connecting seat 13 may be formed at a top of the rear wheel cover 3, two connecting plates 14 are fixedly mounted at the connecting seats 13 of the rear wheel covers 3 on the two sides by means of riveting or screwing respectively, and the other ends of the two connecting plates 14 are fixedly connected to two ends of the shelf 15 by screwing or riveting respectively.

On the basis of the structure of the rear floor described above, rear floor longitudinal beam rear sections 103 are also connected to rear ends of the rear floor longitudinal beams 1 on the two sides respectively, and each of the rear floor longitudinal beam rear sections 103 are inserted with the corresponding rear floor longitudinal beam 1 to be fixedly connected together. Preferably, the two rear floor longitudinal beam rear sections 103 are integrally formed in the extruding mode by adopting aluminum alloy.

Figure 3:
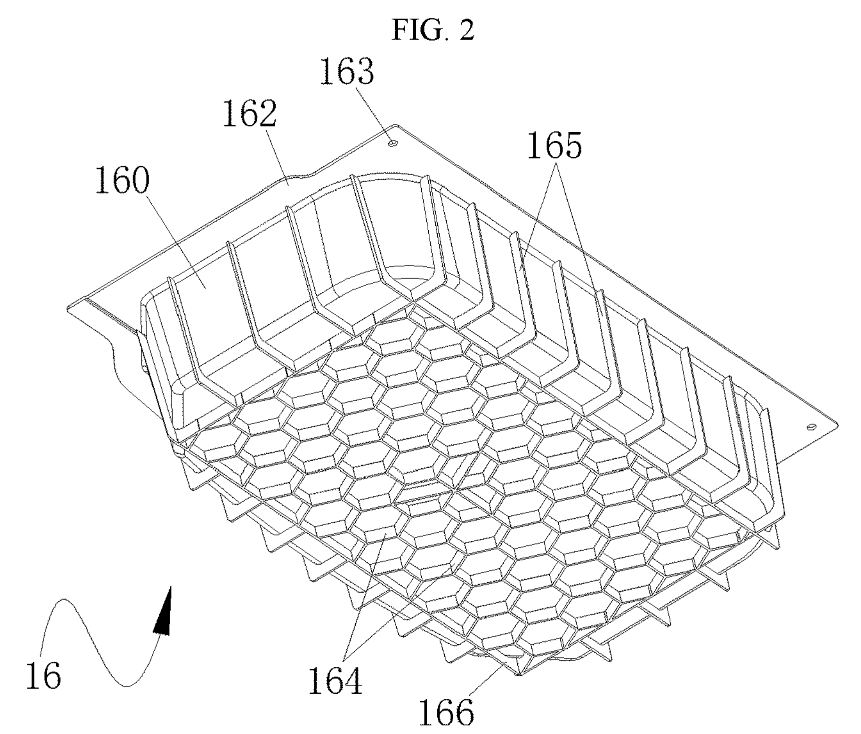
FIG. 3 is a schematic diagram showing an overall structure of the spare tire cabin according to an example of the present disclosure.
Figures 4, 5:
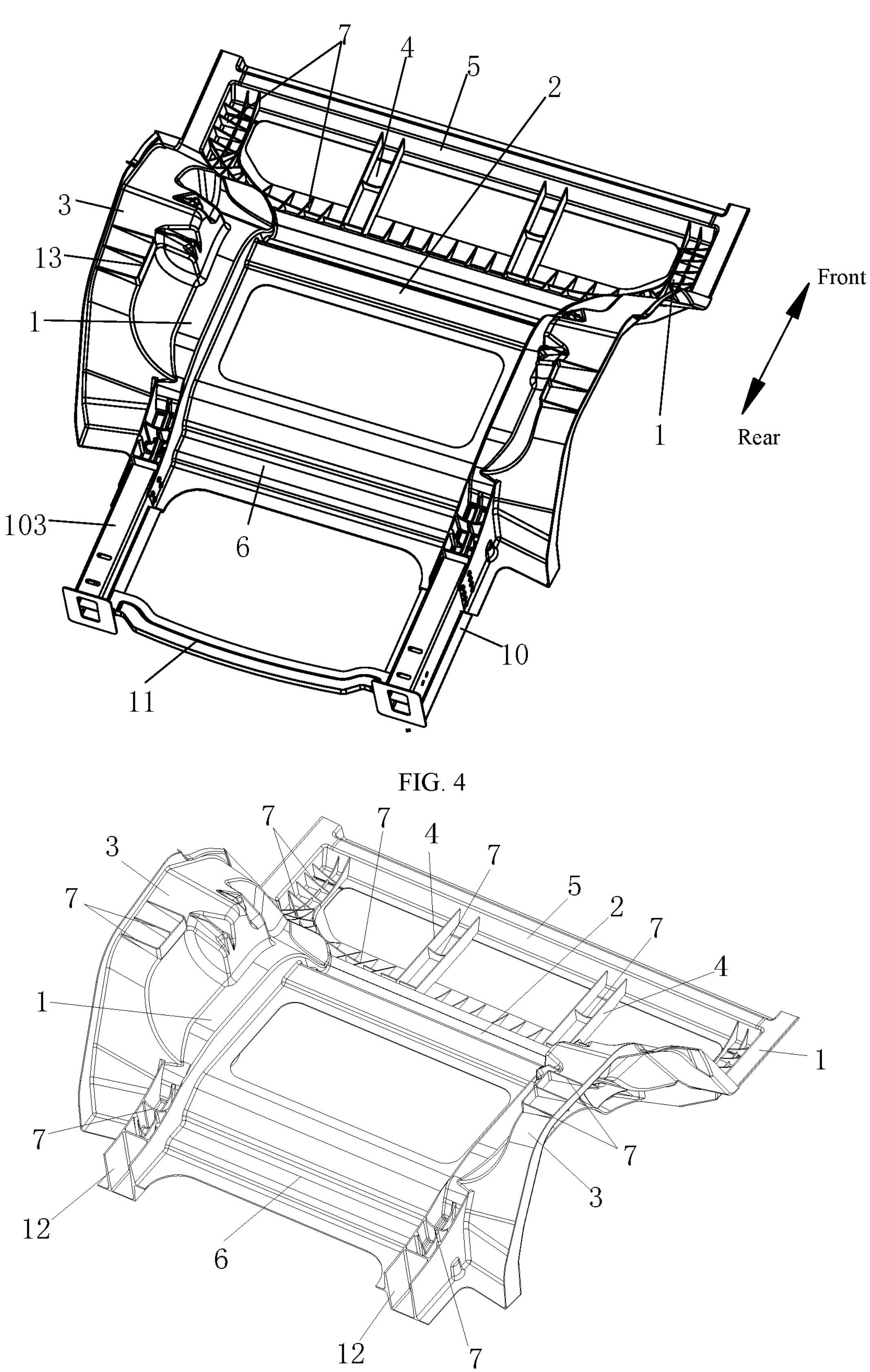
FIG. 4 is a schematic diagram showing an overall structure of the lower vehicle body rear structure according to an example of the present disclosure from another angle of view.
FIG. 5 is a schematic structural diagram of the lower vehicle body rear structure according to an example of the present disclosure after rear floor longitudinal beam rear sections are removed.

As shown in FIG. 3 and FIG. 4, preferably, a structure with a cross section in a shape of a rectangle with a bar across two opposite edges of the rectangle is adopted for the rear floor longitudinal beam rear section 103. The cross section of the rear floor longitudinal beam rear section 103 adopts the structure in the shape of the rectangle with a bar across two opposite edges of the rectangle, thereby being not only convenient to machine and form, but also beneficial to the improvement of the overall strength of the rear floor longitudinal beam rear section 103 itself.

Moreover, an overhanging lap-joint plate 10 is formed at a side portion of the rear floor longitudinal beam rear section 103; and a rear supporting plate 11 may also be connected between the rear ends of the two rear floor longitudinal beam rear sections 103. By additionally arranging the structure of the lap-joint plate 10 with a curled edge at the side portion of the rear floor longitudinal beam rear section 103, the connection and matching between the rear floor longitudinal beam rear section 103 and the rear floor longitudinal beam 1 are facilitated, thereby being beneficial to the improvement of the connecting guidance between the rear floor longitudinal beam rear section 103 and the rear floor longitudinal beam 1.

With regard to the specific connecting mode, the rear floor longitudinal beam 1 and the rear floor longitudinal beam rear section 103 may be fastened by matching with welding or screwing and other forms on the basis of inserting. In this example, an inserted groove 12 is formed in a rear end of the rear floor longitudinal beam 1, and a front end of the rear floor longitudinal beam rear section 103 is inserted into the inserted groove 12; meanwhile, the rear floor longitudinal beam rear section 103 and the rear floor longitudinal beam 1 are fastened and connected together by adopting a rivet. The inserted groove 12 is formed in the rear end of the rear floor longitudinal beam 1, and the rear floor longitudinal beam rear section 103 is fixed to the rear floor longitudinal beam 1 by adopting an inserting mode in combination with a riveting structure, thereby not only having certain connecting firmness, but also enabling the rear floor longitudinal beam rear section 103 to be inserted into the inserted groove 12 of the rear floor longitudinal beam 1 after the rivet is broken when the rear portion of the vehicle encounters a great collision, so as to achieve the effect of further buffering and absorbing energy.

For the lower vehicle body rear structure of this example, by arranging the rear floor middle cross beam 2 and the rear floor force transmission beam 4 for matching with the rear floor longitudinal beam 1, the force transmission path at the rear end of the vehicle is enriched and the strength of the overall structure is enhanced. Meanwhile, the rear floor longitudinal beam rear section 103 inserted at the rear end of the rear floor longitudinal beam 1 may play a certain role in buffering and absorbing energy due to recession, deformation and retraction thereof towards the direction of the rear floor longitudinal beam 1, thereby being beneficial to the improvement of the collision protection performance of the rear portion of the vehicle.

Two rear floor longitudinal beam rear sections 103 are provided to be connected to rear ends of the rear floor longitudinal beams 1 on the two sides respectively, and a rear supporting plate 11 is connected between rear ends of the two rear floor longitudinal beam rear sections 103; in this manner, a mounting space is defined by the rear floor, the rear supporting plate 11, and the rear floor longitudinal beam rear sections 103 on the two sides, and the spare tire cabin 16 above is arranged in the mounting space.

As also shown in FIG. 1 in conjunction with FIG. 3, the spare tire cabin 16 includes a spare tire cabin body 160 formed with an accommodating chamber 161 having a top opening. A curled edge 162 which is curled outwards is formed at a periphery of a top of the spare tire cabin body 160, and the curled edge 162 is provided with a fixing portion 163 for fixing the spare tire cabin body 160 in the mounting space. The fixing portion 163 may be a mounting hole formed in the curled edge 162. The curled edge 162 is arranged at the top of the spare tire cabin body 160, so that the lap-joint plate 10 may be conveniently lapped on a frame defined by the rear floor, the rear floor longitudinal beam rear sections 103, and the rear supporting plate 11; and by arranging the fixing portion 163 on the curled edge 162, the fastening and mounting of the spare tire cabin 16 may be completed in a manner of matching the mounting hole with a screw.

Preferably, a plastic part integrally formed in an injection molding mode is adopted for the spare tire cabin 16, thereby having the advantages of mature process and convenience in machining and molding. With regard to a specific structure on the spare tire cabin body 160, the following solution may be adopted.

A reinforcing structure 164 protruding downwards is formed on the bottom end surface of the spare tire cabin body 160, and the reinforcing structure 164 may be designed as a convex rib structure distributed in a honeycomb shape. Reinforcing ribs 165 protruding outwards may also be arranged on an outer side wall of the spare tire cabin body 160, and a plurality of reinforcing ribs 165 are provided to be distributed at intervals along a circumferential direction of the spare tire cabin body 160.

Meanwhile, in this example, an annular rib 166 protruding downwards is formed on the bottom end surface of the spare tire cabin body 160, and the reinforcing structure 164 above is located inside the annular rib 166; and the reinforcing structure 164 is connected to an inner wall of the annular rib 166. A bottom end of the reinforcing rib 165 extends to the bottom end surface of the spare tire cabin body 160 and connected to an outer wall of the annular rib 166. Through the matching of the reinforcing structures such as the reinforcing structure 164, the reinforcing rib 165 and the annular rib 166, the overall strength of the spare tire cabin 16 may be greatly improved, thereby being beneficial to the improvement of the bearing performance of the spare tire cabin 16.

In addition, a rear floor cover plate 17 may be additionally arranged in an area between the rear floor middle cross beam 2 and the rear floor rear cross beam 6 on a framework formed on the basis of the rear floor to isolate a driving cabin from the outside. A sheet metal part or injection molded part may be adopted for the rear floor cover plate 17, and convex reinforcing structures 170 with different patterns may be constructed on the rear floor cover plate 17.

In order to make full use of a space outside the rear floor longitudinal beam rear section 103, a storage box 18 may be arranged here, and the storage box 18 is fixed to the rear floor longitudinal beam rear section 103 and the rear wheel cover 3 by means of riveting or screwing. The overall shape of the space is relatively foursquare, thereby facilitating the storage of small-sized debris.

According to the lower vehicle body rear structure of the present disclosure, the shelf 15 and the rear floor integrally formed are connected into a whole by means of the connecting plates 14, and the annular reinforcing structure is formed in the height direction of the vehicle body, so that the bearing performance of the shelf 15 located at the rear portion of the vehicle may be improved; the spare tire cabin 16 is mounted in the space defined by the rear floor, the rear floor longitudinal beam rear sections 103, and the rear supporting plate 11, so that the spare tire cabin 16 has a stable bearing foundation; meanwhile, by integrally forming a plurality of beam body structures in the vehicle body framework on the rear floor, the structural compactness and assembly efficiency of the vehicle body framework are improved, so that the overall arrangement structure of the vehicle body framework of the rear portion of the vehicle, the shelf 15, and the spare tire cabin 16 is improved.

On a main structure of the rear floor, as shown in FIG. 4 and FIG. 5, the rear floor longitudinal beam 1 and the rear floor force transmission beam 4 on each side are connected by means of the rear floor middle cross beam 2 to form a herringbone-shaped force transmission passage.

It should be noted that the herringbone-shaped shape in this example, namely the shape as shown in FIG. 4, the rear floor longitudinal beam 1 and the rear floor force transmission beam 4 on each side which are connected by means of the rear floor middle cross beam 2 resemble a herringbone-shaped structure in the overall visual sense.

In addition, the rear floor middle cross beam 2 in this example may also form an auxiliary force transmission passage between the rear floor longitudinal beams 1, thereby further enhancing the force transmission and decomposition effects of the rear floor structure. Based on the above overall description, for the lower vehicle body rear structure of this example, as a preferred embodiment, as shown in FIG. 4 to FIG. 6, a rear floor connecting beam 5 is also formed at a front end of the rear floor, the rear floor connecting beam 5 is connected between the rear floor longitudinal beams 1 on the two sides, and a front end of each of the rear floor force transmission beams 4 is connected to the rear floor connecting beam 5.

Figure 6:
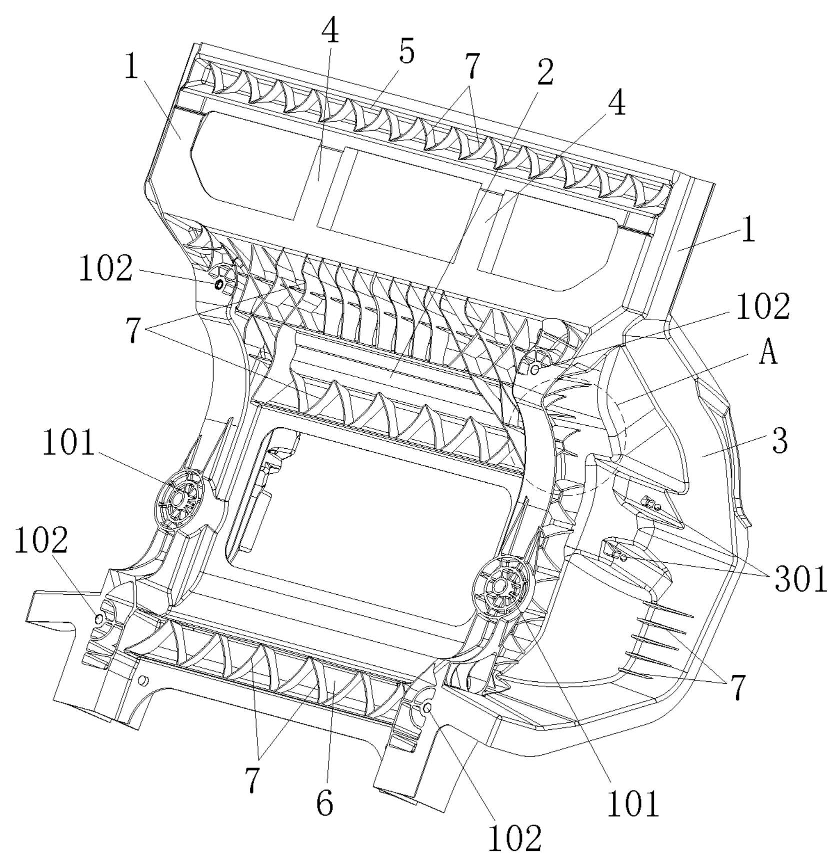
FIG. 6 is a schematic diagram showing the structure of FIG. 5 from another angle of view.
Figure 7:
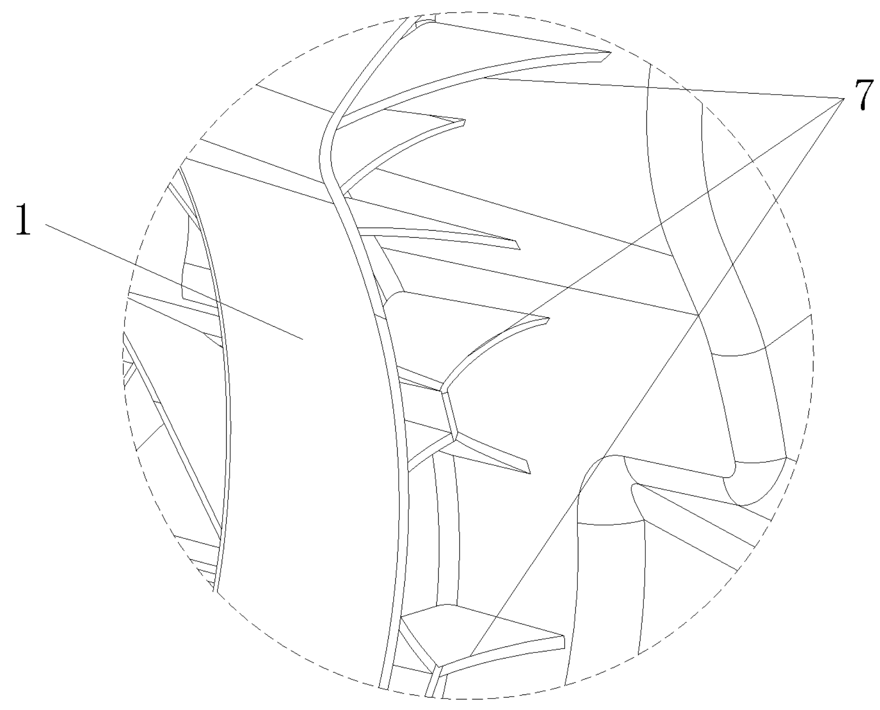
FIG. 7 is a partially enlarged diagram of a portion A in FIG. 6.

Preferably, as also shown in FIG. 4 to FIG. 6, in this example, a rear floor rear cross beam 6 is formed near the rear end of the rear floor, and the rear floor rear cross beam 6 is connected between the rear floor longitudinal beams 1 on the two sides. The rear floor rear cross beam 6 may form another force transmission passage between the rear floor longitudinal beams 1 on the two sides in a stressed process of the rear floor structure of this example, and is matched with the force transmission passage formed between the rear floor middle cross beam 2 and the rear floor longitudinal beams 1 on the two sides, thereby improving the force transmission and decomposition effects of the rear floor structure, and reducing the risk of bending of the rear floor structure.

That is, in the case of a collision, for the rear floor structure of this example, the force dispersion and transmission may be achieved by the herringbone-shaped force transmission passage, and the force dispersion and transmission may be achieved once again by the auxiliary force transmission passage formed by the rear floor middle cross beam 2 and the rear floor rear cross beam 6 respectively, so that the overall force transmission and decomposition effects of the rear floor structure may be effectively improved.

In this example, it should be noted that the rear wheel covers 3 described above may be integrally formed in the die-casting mode with the rear floor longitudinal beams 1, or the rear wheel covers 3 may also be separately formed and then connected to the rear floor longitudinal beams 1, and preferably the rear wheel covers 3 are integrally formed in the die-casting mode with the rear floor longitudinal beams 1.

As shown in FIG. 4 and FIG. 6, a rear spring mounting seat 101 is formed on the rear floor longitudinal beams 1 on the two sides respectively, and a rear shock absorber mounting seat 301 is formed on the rear wheel covers 3 on the two sides respectively. The specific structural design of the rear spring mounting seat 101 and the rear shock absorber mounting seat 301 may refer to relevant structural portions of the lower vehicle body rear structure in the prior art, and in the specific structural design, it is necessary to ensure adaptation to mounting positions of a rear shock absorbing spring and a rear shock absorber which are configured.

In specific implementation of this example, rear suspension mounting points 102 are arranged on the rear floor longitudinal beams 1 on the two sides respectively for mounting a rear suspension, and two rear suspension mounting points 102 are provided to be arranged at intervals on the rear floor longitudinal beam 1 on each side. Of course, the positional arrangement of the two rear suspension mounting points 102 may be adjusted and set accordingly according to actual mounting requirements or vehicle body design requirements, and it is only necessary to ensure that the assembly of corresponding suspension members is facilitated. As shown in FIG. 6, the two rear suspension mounting points 102 are arranged at positions adjacent to an upper end and a lower end of the rear wheel cover 3 respectively.

In addition, a reinforcing rib 7 is formed on at least one of the rear floor longitudinal beams 1, the rear floor middle cross beam 2, the rear wheel covers 3, the rear floor force transmission beams 4, the rear floor connecting beam 5, and the rear floor rear cross beam 6 to improve the local rigidity of the rear floor structure. FIG. 4 to FIG. 7 show an illustration in which the reinforcing ribs 7 are formed on all of the rear floor longitudinal beams 1, the rear floor middle cross beam 2, the rear wheel covers 3, the rear floor force transmission beams 4, the rear floor connecting beam 5, and the rear floor rear cross beam 6.

It is worth mentioning that the above reinforcing ribs 7 may be designed in an arrangement position and structure adapted to the rigidity requirements of corresponding portions in the rear floor structure. In the design of the arrangement position, taking the rear floor middle cross beam 2 shown in FIG. 5 and FIG. 6 for example, a plurality of reinforcing ribs 7 are arranged on the two sides of the rear floor middle cross beam 2. In the structural design, for example, the rigidity reinforcing effect of the reinforcing ribs 7 may be improved by increasing a wall thickness, and the reinforcing effect on the rear floor structure may also be improved by increasing the reinforcing ribs 7 or improving the structural design of the reinforcing ribs 7.

In addition, in order to improve the weight reduction of the whole vehicle, the rear floor in this example is integrally formed in the die-casting mode by adopting cast aluminum, and compared with the conventional rear floor structure made of sheet metal, the weight of the rear floor structure made of the cast aluminum material may be reduced by about 20%. According to the lower vehicle body rear structure of this example, the rear floor is integrally formed in the die-casting mode, so that the structural rigidity of the lower vehicle body rear structure may be effectively improved, meanwhile, by arranging the rear floor force transmission beam 4, the herringbone-shaped force transmission passage may also be formed by matching with the rear floor longitudinal beam 1 and the rear floor middle cross beam 2, and then a force on the rear floor longitudinal beam 1 may be effectively transmitted and decomposed, thereby effectively reducing the risk of bending in the event of a collision.

In addition, the rear floor is integrally formed in the die-casting mode by adopting the aluminum material, so that the rear floor is simple in connecting mode, small in quantity of parts, high in size precision, convenient to machine and manufacture, and beneficial to achieving the weight reduction of the overall structure.

Figure 8:
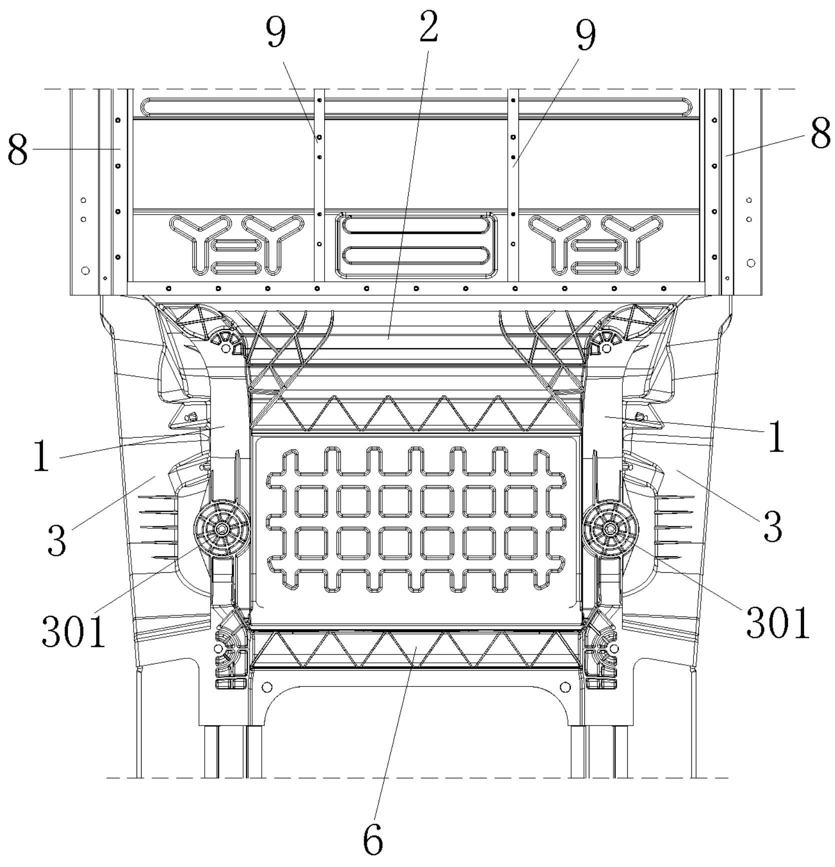
FIG. 8 is a schematic diagram showing a partial structure in a vehicle body according to an example of the present disclosure.

When the lower vehicle body rear structure described above is applied in the vehicle, as shown in FIG. 8, in the vehicle body of vehicle of this example, a front floor reinforcing longitudinal beams 9 are arranged between doorsill beams 8 on the two sides, and a plurality of front floor reinforcing longitudinal beams 9 are provided to be arranged in one-to-one correspondence with each of the rear floor force transmission beams 4.

Wherein the front floor reinforcing longitudinal beams 9 form a longitudinal force transmission structure passing through a middle portion of the whole vehicle, and in the specific implementation, the rear floor connecting beam 5 in the rear floor is lapped to the front floor rear cross beam structure between the rear ends of the doorsill beams 8 on the two sides. At the moment, due to the connection, force transmission connection is formed between the rear floor longitudinal beam 1 and the doorsill beam 8 on each side, and force transmission connection is also formed between each of the rear floor force transmission beams 4 and the corresponding front floor reinforcing longitudinal beam 9.

Figure 9:
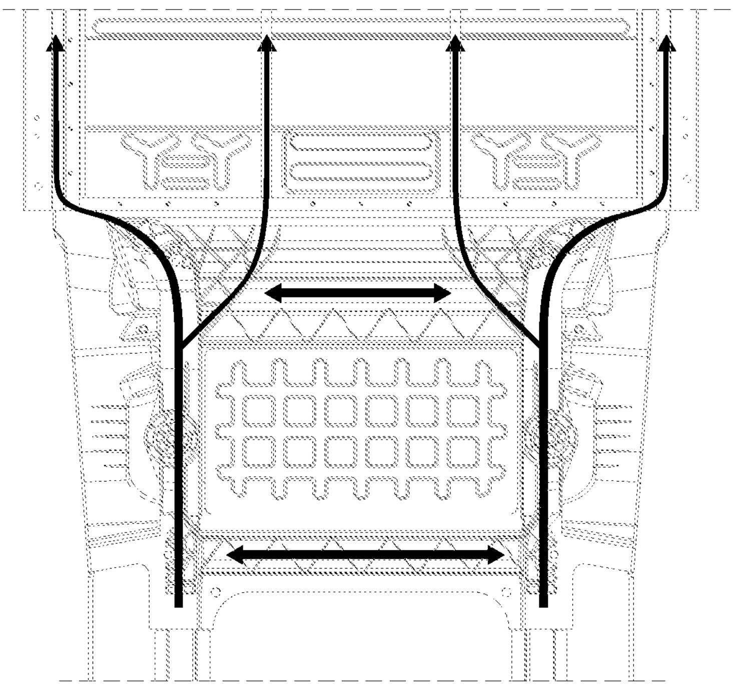
FIG. 9 is a schematic diagram showing a force transmission path when the vehicle body according to an example of the present disclosure in a collision.

Thus, when the vehicle encounters a rear collision, a stressed process of the vehicle body may refer to FIG. 9. A collision force is transmitted forwards along the rear floor longitudinal beam 1, and then the herringbone-shaped force transmission passage formed by the rear floor longitudinal beam 1 and the adjacent rear floor force transmission beam 4 on each side further divides the collision force into two parts, one part of which is transmitted to the doorsill beam 8 on the corresponding side via the rear floor longitudinal beam 1, and the other part of which is transmitted to the corresponding front floor reinforcing longitudinal beam 9 via the rear floor force transmission beam 4.

In addition, as both the rear floor middle cross beam 2 and the rear floor rear cross beam 6 are connected to the rear floor longitudinal beams 1 on the two sides, and two auxiliary force transmission passages are also formed, a part of the collision force is also transmitted and decomposed via the two auxiliary force transmission passages.

It can be seen therefrom that by adopting the lower vehicle body rear structure of this example, the structural rigidity of the rear floor structure may be effectively improved, and the force transmission path of the vehicle body structure may be optimized, thereby effectively improving the structural rigidity of the overall vehicle body structure of the vehicle, improving the force transmission and decomposition effects of the vehicle body structure, and effectively improving the safety of the vehicle.

Finally, this example further relates to a vehicle, wherein a vehicle body of the vehicle is provided with the lower vehicle body rear structure as described above.

While the foregoing is directed to the preferred examples of the present disclosure, the present disclosure is not limited to the disclosed examples. Any modification, equivalent and improvement made within the spirit and principle of the present disclosure shall be included in the protection scope of the present disclosure.

What is claimed is:

1. A lower vehicle body rear structure, comprising:

a rear floor integrally formed in a die-casting mode, rear floor longitudinal beam rear sections fixedly connected to the rear floor, a shelf, and a spare tire cabin;

wherein the rear floor is formed with rear floor longitudinal beams arranged on two sides of the rear floor, a rear floor middle cross beam and a rear floor rear cross beam, wherein the rear floor middle cross beam and the rear floor rear cross beam are connected between the rear floor longitudinal beams on the two sides; and rear wheel covers respectively connected to the rear floor longitudinal beams on corresponding sides are arranged on the two sides of the rear floor;

the shelf is located above the rear floor, and two ends of the shelf are arranged in one-to-one correspondence with the rear wheel covers on the two sides and both connected to corresponding rear wheel covers respectively by two connecting plates; and the rear floor, the shelf and the two connecting plates are connected to form an annular structure arranged along a height direction of a vehicle body; and a number of the rear floor longitudinal beam rear sections is two, and the rear floor longitudinal beam rear sections are connected to rear ends of the rear floor longitudinal beams on the two sides, a rear supporting plate is connected between rear ends of the two rear floor longitudinal beam rear sections, and the spare tire cabin is arranged in a mounting space defined by the rear floor, the rear supporting plate, and the rear floor longitudinal beam rear sections on the two sides;

wherein rear floor force transmission beams are formed on inner sides of the rear floor longitudinal beams on the two sides; a rear end of each of the rear floor force transmission beams is connected to the rear floor middle cross beam; and the rear floor longitudinal beams and the rear floor force transmission beams on each side are connected by the rear floor middle cross beam to form a herringbone-shaped force transmission passage.

2. The lower vehicle body rear structure according to claim 1, wherein a rear floor connecting beam is formed at a front end of the rear floor;

the rear floor connecting beam is connected between the rear floor longitudinal beams on the two sides; and a front end of each of the rear floor force transmission beams is connected to the rear floor connecting beam.

3. The lower vehicle body rear structure according to claim 2, wherein a reinforcing rib is formed on at least one of the rear floor longitudinal beams, the rear floor middle cross beam, the rear wheel covers, the rear floor force transmission beams, the rear floor connecting beam, and the rear floor rear cross beam.

4. The lower vehicle body rear structure according to claim 1, wherein a rear spring mounting seat is formed on the rear floor longitudinal beams on the two sides, respectively.

5. The lower vehicle body rear structure according to claim 1, wherein a rear shock absorber mounting seat is formed on the rear wheel covers on the two sides, respectively.

6. The lower vehicle body rear structure according to claim 1, wherein the rear floor longitudinal beam rear sections are integrally formed in an extruding mode;

a cross section of the rear floor longitudinal beam rear sections is in a shape of a rectangle with a bar across two opposite edges of the rectangle; and an overhanging lap-joint plate is formed at a side portion of the rear floor longitudinal beam rear sections.

7. The lower vehicle body rear structure according to claim 1, wherein an inserted groove is formed in each of the rear ends of the rear floor longitudinal beams; and each of the rear floor longitudinal beam rear sections is fixedly inserted in the inserted groove of corresponding rear floor longitudinal beam.

8. The lower vehicle body rear structure according to claim 1, wherein the shelf comprises an upper plate, and a lower plate buckled and fixedly connected to a bottom of the upper plate;

the upper plate is provided with a plurality of bending portions to be similar to a shape of steps; and a cavity is defined by the lower plate and the upper plate.

9. The lower vehicle body rear structure according to claim 8, wherein a connecting seat is formed at a top of each of the rear wheel covers;

a first end of the connecting plates connected to the rear wheel covers is connected to the connecting seat; and a second end of the connecting plates connected to the shelf is connected to a bottom of the lower plate.

10. The lower vehicle body rear structure according to claim 1, wherein the spare tire cabin comprises a spare tire cabin body formed with an accommodating chamber having a top opening;

a curled edge curled outwards is formed at a top of the spare tire cabin body, and the curled edge is provided with a fixing portion for fixing the spare tire cabin body in the mounting space; and a reinforcing structure protruding downwards is formed on a bottom end surface of the spare tire cabin body, and the reinforcing structure is in a honeycomb shape.

11. The lower vehicle body rear structure according to claim 10, wherein reinforcing ribs protruding outwards are formed on an outer side wall of the spare tire cabin body; and a number of the reinforcing ribs is more than one, and the reinforcing ribs are distributed at intervals along a circumferential direction of the spare tire cabin body.

12. The lower vehicle body rear structure according to claim 11, wherein an annular rib protruding downwards is formed on the bottom end surface of the spare tire cabin body;

the reinforcing structure is located inside the annular rib and connected to an inner wall of the annular rib; and a bottom end of the reinforcing ribs extends to the bottom end surface of the spare tire cabin body and connected to an outer wall of the annular rib.

13. The lower vehicle body rear structure according to claim 1, wherein the rear floor is integrally formed in the die-casting mode by adopting cast aluminum;

the shelf is integrally formed in an extruding mode by adopting aluminum alloy; and the spare tire cabin is integrally formed in an injection molding mode.

14. A vehicle, wherein a vehicle body of the vehicle is provided with the lower vehicle body rear structure according to claim 1.

* * * * *